(12) United States Patent
Gottwick et al.

(10) Patent No.: US 7,770,982 B2
(45) Date of Patent: Aug. 10, 2010

(54) ELECTROHYDRAULIC BRAKING SYSTEM

(75) Inventors: Ulrich Gottwick, Stuttgart (DE); Michael Kunz, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 840 days.

(21) Appl. No.: 10/556,596

(22) PCT Filed: Jul. 27, 2004

(86) PCT No.: PCT/DE2004/001675

§ 371 (c)(1),
(2), (4) Date: Nov. 14, 2005

(87) PCT Pub. No.: WO2005/035330

PCT Pub. Date: Apr. 21, 2005

(65) Prior Publication Data

US 2006/0202551 A1 Sep. 14, 2006

(30) Foreign Application Priority Data

Sep. 17, 2003 (DE) ................. 103 42 937

(51) Int. Cl.
*B60T 8/34* (2006.01)
(52) U.S. Cl. ................. 303/113.4; 303/11
(58) Field of Classification Search .......... 303/11, 303/113.4
See application file for complete search history.

(56) References Cited

U.S. PATENT DOCUMENTS

| | | | |
|---|---|---|---|
| 4,753,490 A | 6/1988 | Belart et al. | |
| 5,253,929 A * | 10/1993 | Ohori | 303/3 |
| 5,855,417 A | 1/1999 | Johnston et al. | |
| 5,941,608 A * | 8/1999 | Campau et al. | 303/113.4 |
| 6,079,793 A * | 6/2000 | Takayama et al. | 303/14 |
| 6,086,166 A * | 7/2000 | Fukasawa | 303/152 |
| 6,132,015 A * | 10/2000 | Aoyama | 303/152 |
| 6,158,825 A * | 12/2000 | Schunck et al. | 303/115.4 |
| 6,206,484 B1 * | 3/2001 | Ganzel | 303/113.4 |
| 6,402,265 B1 * | 6/2002 | Hachtel | 303/115.4 |
| 6,406,105 B1 * | 6/2002 | Shimada et al. | 303/152 |
| 6,464,307 B1 * | 10/2002 | Yoshino | 303/11 |
| 6,517,170 B1 * | 2/2003 | Hofsaess et al. | 303/11 |

(Continued)

FOREIGN PATENT DOCUMENTS

DE 35 11 535 A1 10/1986

(Continued)

*Primary Examiner*—Pam Rodriguez
(74) *Attorney, Agent, or Firm*—Ronald E. Greigg

(57) ABSTRACT

An electrohydraulic brake system having a muscle-force-actuatable auxiliary brake and an external-force-actuatable service brake includes operating mode switchover valves triggerable by an electronic control unit for switching from the service braking state to the auxiliary braking state. A piston/cylinder unit with a pressure medium connection between a master cylinder and a wheel brake which is interrupted by the switchover valves to simulate the pedal travel in the service braking state. The piston/cylinder receives the pressure medium displaced in the master cylinder by actuation of the brake pedal by the driver's foot. The piston/cylinder unit can be hydraulically blocked in the auxiliary braking state so that pressure medium positively displaced in the master cylinder is available to the greatest possible extent for building up pressure at the wheel brakes. The subjection of the piston/cylinder unit to pressure medium is controlled via one of the operating mode switchover valves.

11 Claims, 1 Drawing Sheet

U.S. PATENT DOCUMENTS

| | | | |
|---|---|---|---|
| 6,739,677 B2 * | 5/2004 | Tazoe et al. | 303/152 |
| 6,813,553 B2 * | 11/2004 | Nakamura et al. | 701/70 |
| 6,913,326 B1 * | 7/2005 | Ohkubo et al. | 303/11 |
| 7,010,410 B2 * | 3/2006 | Zhang et al. | 701/70 |
| 7,136,737 B2 * | 11/2006 | Ashizawa et al. | 701/70 |
| 2001/0002236 A1 | 5/2001 | Mohr et al. | |
| 2001/0024062 A1 * | 9/2001 | Yoshino | 303/152 |
| 2001/0048243 A1 * | 12/2001 | Nakano | 303/117.1 |
| 2005/0159871 A1 * | 7/2005 | Nakamura et al. | 701/70 |

FOREIGN PATENT DOCUMENTS

| | | |
|---|---|---|
| DE | 198 17 190 C1 | 7/1999 |
| DE | 198 33 410 A1 | 2/2000 |
| DE | 100 39 670 A1 | 3/2002 |
| JP | 4-218458 | 8/1992 |

* cited by examiner

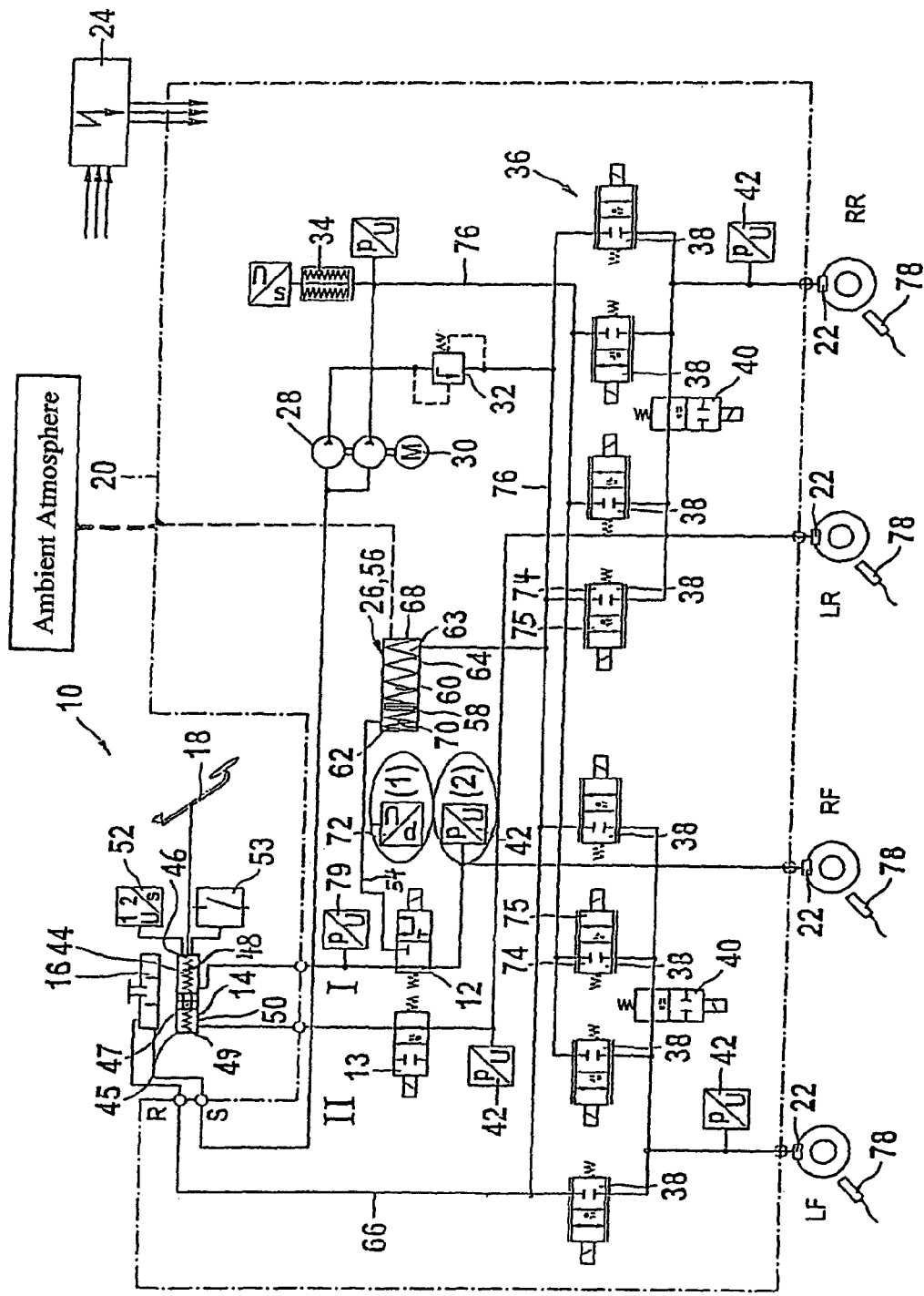

ELECTROHYDRAULIC BRAKING SYSTEM

CROSS-REFERENCE TO RELATED APPLICATIONS

This application is a 35 USC 371 application of PCT/DE 2004/001675 filed on Jul. 27, 2004.

BACKGROUND OF THE INVENTION

1. Field of the Invention

The invention is directed to an improved electrohydraulic brake system for a vehicle.

2. Description of the Prior Art

A brake system of the type with which this invention is concerned has already been disclosed, for instance in German Patent Disclosure DE 196 36 432 A1. This known brake system has a muscle-force-actuatable auxiliary brake and an external-force-actuatable service brake. For switching the brake system over from the service braking state to the auxiliary braking state, such brake systems have operating mode switchover valves, which are triggerable by an electronic control unit. Moreover, for simulating the pedal travel in the service braking state of the brake system, in which a pressure medium connection between a master cylinder and a wheel brake is interrupted by the aforementioned operating mode switchover valves, there is a piston/cylinder unit which receives the volume of pressure medium positively displaced in the master cylinder by the actuation of the brake pedal by the driver's foot. The piston/cylinder unit can be hydraulically blocked in the auxiliary braking state of the brake system, so that the volume of pressure medium positively displaced in the master cylinder is available to the greatest possible extent for building up pressure at the wheel brakes. The valves for switching over between the two modes of operation of the brake system and the blocking valve of the piston/cylinder unit are embodied separately. This increases the number of existing components as well as the effort and expense of assembly and the installation space required. Finally, the number of potential sources of error increase, as do costs.

SUMMARY AND ADVANTAGES OF THE INVENTION

A brake system in accordance with the invention has the advantage over the prior art that while using as few individual parts as possible, it is extremely compact and inexpensive. It is furthermore possible to monitor the blocking function of the piston/cylinder unit hydraulically as well. The space-saving design of the brake system is also obtained in particular because at least the valve assembly for switching the brake system over from the service braking state to the auxiliary braking state, an externally triggerable pressure generator unit, and a device for modulating the brake pressure are disposed in a common housing block. It possible for there to be no perceptible feedback to the driver at the brake actuation unit during the service braking state from the regulating behavior of the electrohydraulic brake system, while precisely such feedback is possible. As a result, the proposed brake system is adaptable specifically to particular customer requirements. An especially advantageous design of a multi-position valve for electronic monitoring of the blocking function is provided.

DRAWING BRIEF DESCRIPTION OF THE DRAWING

The above and other features of thee invention will become apparent from the detailed description contained below, taken in conjunction with the single drawing FIGURE which is a simplified schematic a hydraulic circuit for the system.

DESCRIPTION OF THE PREFERRED EMBODIMENT

The electrohydraulic brake system 10 of the invention, shown in the drawing, includes a muscle-force-actuatable auxiliary brake and an external-force-actuatable service brake. Both partial systems of these brake systems utilize common components but are separated from one another by so-called operating mode switchover valves 12, 13. The auxiliary brake is active only in the event of a malfunction of the service brake.

The electrohydraulic brake system 10, besides a master cylinder 14 with a closed container 16 for brake fluid and an actuating unit in the form of a brake pedal 18 that can be actuated by the driver using muscle force, has a hydraulic unit 20 for controlling the brake pressures in a total of four wheel brakes 22, connected to this hydraulic unit 20, as well as an electronic control unit 24, which electrically triggers the components of the hydraulic unit 20. The four wheel brakes 22 are identified in the drawing by the letters LF, RF, LR and RR, in accordance with their location in a vehicle equipped with the brake system 10.

The hydraulic unit 20, in a block of a nonferrous metal material (not shown) preferably produced by extrusion, has two operating mode switchover valves 12, 13, a pedal travel simulator 26, a pressure source 28 along with its drive 30, a pressure limiting valve 32, a reservoir 34, a pressure modulating device 36 comprising a total of eight proportional multi-position valves 38, along with balance valves 40 and pressure sensors 42. To that end, the block of the hydraulic unit 20 is provided, by metal-cutting postmachining, with pressure medium conduits and receptacles for the aforementioned components. Particularly by the disposition of the pedal travel simulator 26 on this hydraulic unit 20, the required installation space for the brake system 10 of the invention in a motor vehicle is improved considerably.

The four wheel brakes 22 are connected into two separate brake circuits I and II. Each brake circuit is assigned a pressure chamber 44, 45 in the master cylinder 14. The pressure chambers are located axially one after the other, and each has its own pressure piston 46, 47. A first pressure piston 46 is actuated by the brake pedal 18; the second pressure piston 47 is embodied as a floating piston, which is braced relative to the first pressure piston 46 by means of a first spring 48. A second compression spring 49 acting on the second pressure piston 47 is braced on a housing 50, of the master cylinder 14 and brings about the restoration of the brake pedal 18 to its outset position, once the brake actuation force is withdrawn by the driver. Also mounted on the master cylinder 14 are two sensors 52, 53, which in accordance with their function are called the pedal travel sensor 52 and the brake light switch 53. The pedal travel sensor 52 detects the actuation travel of the brake pedal 18 and converts this travel signal into a voltage signal, while the brake light switch 53 outputs a signal as soon as a brake light of the vehicle lights up in response to the pressure buildup in the first pressure chamber 44 of the master cylinder 14. Both signals are processed in the electronic control unit 24 and serve to control the brake system 10.

The brake circuit I connected to the first pressure chamber 44, toward the brake pedal, leads from the master cylinder 14 to the operating mode switchover valve 12 and from there leads directly to the wheel brakes LF and RF 22 of the front axle. In the muscle-force-actuated auxiliary braking state of the brake system 10, that is, when the operating mode switchover valve 12 is not actuated, a pressure buildup in the wheel brakes 22 by the muscle force of the driver is thus assured.

The brake system 10 furthermore has the so-called pedal travel simulator 26. In the case of the exemplary embodiment of FIG. 1, it is located in a branch 54 of the first brake circuit I and is formed by a piston/cylinder unit 56. A piston 58 of the pedal travel simulator 26 divides a cylindrical chamber 60 into two chambers 62, 63, the first of which can be subjected to pressure medium from the master cylinder 14. The second chamber 63, located away from the first, receives a restoring spring 64 that actuates the piston 58 and may alternatively be filled with pressure medium (Variation 1, represented by a solid line), by being connected to a return conduit 66 in the block of the hydraulic unit 20 in which pressure medium flows back from the wheel brakes 22 to the container 16, or it may be vented to the ambient atmosphere (Variation 2, shown in dashed lines). In the drawing, for the sake of simplicity, both variations are shown side by side. With the aforementioned restoring spring 64 that engages the piston 58, the force/travel characteristic of the pedal travel simulator 26 can be applied to suit a particular use.

The subjection of the pedal travel simulator 26 to pressure media is controlled according to the invention by one of the two operating mode switchover valves 12, 13. Both of the operating mode switchover valves 12, 13 can be switched over into two switching positions. This switchover is effected by means of electronic triggering by the control unit 24, counter to the force of a restoring spring. In the nontriggered basic position, the operating mode switchover valves 12, 13 enable a pressure fluid connection from the master cylinder 14 to the wheel brakes 22 of the front axle. The operating mode switchover valve 12 that according to the invention simultaneously controls the pedal travel simulator 26 has a total of three hydraulic connections, while the second operating mode switchover vale 13 makes do with only two connections. This latter operating mode switchover valve 13 can be switched over from an open position to a blocking position. The operating mode switchover valve 12 that controls the pedal travel simulator 26 can conversely be brought from an open position, in which a pressure medium communication exists between the master cylinder 14 and at least one wheel brake 22 while simultaneously a hydraulic communication from the master cylinder 14 to the pedal travel simulator 26 is blocked, into a switching position, in which these conditions are inverted. In the branch 54, between the operating mode switchover valve 12 that controls the pedal travel simulator 26 and the pedal travel simulator 26 itself, according to the invention there is an additional pressure sensor 72 for detecting the pressure level prevailing in the pedal travel simulator 26. Besides this pressure sensor 72, the brake system 10 has further pressure sensors 42 for detecting the pressure level at each of the individual wheel brakes 22. A pressure sensor 79 is additionally connected between the master cylinder 14 and the operating mode switchover valve 12 that controls the pedal travel simulator 26.

The external-force-actuatable service brake is formed by a pressure source 28, driven by an electric motor; a reservoir 34 downstream of this pressure source 28, which is preferably a diaphragm reservoir; and a pressure limiting valve 32 for reducing pressure peaks that exceed a level dictated by the design of the pressure limiting valve 32. For example, a dual pump acted upon by a common drive mechanism 30 is used as the pressure source 28.

Via a pressure medium conduit in the hydraulic unit 20, the pressure source 28 aspirates pressure medium from the container 16 and pumps it into the hydraulic reservoir. The stored hydraulic energy is then available to the pressure modulating device 36, which is located hydraulically upstream of the individual wheel brakes 22. This involves a total of eight 2/2-way proportional valves 38, which are triggerable electromagnetically counter to spring force, and which in their basic position, not shown, assume a blocking position 74 and in their switching position in which they are supplied with current assume an open position 75. Two each of these proportional modulation valves 38 are assigned to one wheel brake 22, and in turn one each of the two modulation valves 38 of each wheel brake 22 communicates with an inlet 76, arriving from the pressure source 28, while the second modulation valve 38 communicates with the return conduit 66 to the container 16. By triggering the two modulation valves 38 of one wheel brake 22 by means of the electronic control unit 24, the pressure level at the applicable wheel brake 22 can be regulated continuously variably and feasibly; the regulation is oriented to the slip conditions that prevail at the applicable wheel of a vehicle. These slip conditions can be detected by wheel rpm sensors 78, which are mounted on each vehicle wheel, and further processed in the control unit 24 into trigger signals, for the modulation valves 38 among others.

In the service braking state, or in other words with active external-force braking, the operating mode switchover valves 12, 13 are in their switching position and, as explained, are blocking the master cylinder 14 from the wheel brakes 22. Simultaneously there is a communication from one of the pressure chambers 44, 45 of the master cylinder 14 to the pedal travel simulator 26, so that pressure medium can flow in that direction. As a result, the driver has a familiar pedal feel, even though the pedal actuation serves solely to detect his braking demands but does not serve to furnish the brake pressure itself. In the service braking state, as noted, this brake pressure is furnished by the pressure source 28. The driver's braking demand is detected by evaluating the signals of the brake light switch 53, pressure sensor 79, and pedal travel sensor 52 and converted into trigger signals for the pressure source 28, the operating mode switchover valves 12, 13, and the modulation valves 38 of the pressure modulating device 36.

Besides this, the brake system 10 also has the so-called balance valves 40. Each axle of a vehicle is assigned one such balance valve 40. These are normally open ⅔-way switchover valves, actuatable electromagnetically counter to spring force, which regulate a pressure medium communication between the two wheel brakes 22 of one vehicle axle. In the nontriggered basic position, this communication is opened, so that an identical brake pressure is established at both wheel brakes 22 of one vehicle axle. Supplying current to the balance valves 40 interrupts this communication, and the wheel brakes 22 of one axle can be regulated individually.

The pressure sensor 72 that according to the invention precedes the pedal travel simulator 26 serves the brake system 10 described for hydraulic monitoring of the blocking function of the operating mode switchover valve 12. By an early withdrawal of current from the operating mode switchover valve 12 that controls the pedal travel simulator 26 if the actuation of the brake pedal 18 is quickly withdrawn by the driver, it is possible by evaluation of the signal of the pressure sensor 72 preceding the pedal travel simulator 26 to check whether the pressure prevailing in the pedal travel simulator 26 can be maintained by the switchover valve 12 in the pedal travel simulator 26, so that the blocking function of the operating mode switchover valve is assured, or whether, as in the event of a defect, the pressure trapped in the pedal travel simulator 26 is quickly dropping. Moreover, monitoring of the switchover function of the operating mode switchover valve 12 can be done electronically in the electronic control unit 24 by evaluating the currents flowing to the operating mode switchover valve 12. This monitoring is done during the service braking state of the brake system 10, so that incipient errors can already be ascertained early, that is, before a switchover to the auxiliary braking state, and indicated to the driver in a suitable way. The operating safety of the brake system 10 is thus enhanced substantially.

In the exemplary embodiment, the chamber 63 of the pedal travel simulator 26 that is not subjected to the pressure medium from the master cylinder 14 may communicate with the return conduit 66 to the container 16. If the operating mode switchover valve 12, 13 is actuated, or in other words in the service braking state of the brake system 10, there is accordingly a hydraulic feedback between the wheel brake 22 and the master cylinder 14, on the basis of which the regulating events that proceed in the applicable wheel brake 22 are perceptible to the driver from slight pulsating motions of the brake pedal 18. Some vehicle manufacturers want this.

Other vehicle manufacturers decide not to provide this feedback to the driver, for reasons of driver comfort. This can be achieved with the proposed brake system 10 by providing that the chamber 63 of the pedal travel simulator 26 that is not subjected to the pressure medium from the master cylinder 14 is in communication with the ambient atmosphere. In that case, however, more effort and expense must be expended for effectively sealing off the piston 58 of the pedal travel simulator 26 from external leakage.

It is understood that further modifications or expansions of the exemplary embodiment described are possible without departing from the fundamental concept of the invention. In this connection, it should be noted that it would naturally be possible to separate the functions of the operating mode switchover valve 12 that controls the pedal travel simulator 26 and transferring them to two 2/2-way switchover valves that can be electronically triggered in common. It would furthermore be conceivable to connect the pedal travel simulator 26 hydraulically to the second pressure chamber 45 of the master cylinder 14, that is, the one that has the floating piston 47, and to embody the operating mode switchover valve 13, instead of the operating mode switchover valve 12, accordingly as a 3/2-way valve.

The invention claimed is:

1. In an electrohydraulic brake system for a vehicle, the system comprising: a muscle-force-actuatable auxiliary brake including a master cylinder and an actuating device for the master cylinder, an external-force-actuatable service brake including an electronic control unit and a pressure generator unit triggerable by the control unit, the pressure generator unit including a drive and a pressure source, an electronically triggerable valve assembly for switching the brake system over from the service braking state to the auxiliary braking state, at least one hydraulic wheel brake, at least one device for modulating the brake pressure at the wheel brake, which modulating device is interposed between the valve assembly for switching over the brake system and the at least one wheel brake and being triggerable by the control unit, and a piston/cylinder unit for simulating the pedal travel during the service braking state, which in the auxiliary braking state is connected to the master cylinder in a hydraulically blockable manner, the improvement wherein a valve of said valve assembly for switching over the brake system is interposed between the master cylinder and the piston/cylinder unit such that a subjection of the piston/cylinder unit to pressure medium is controlled by said valve, and further comprising a pressure sensor disposed between the valve of the valve assembly that controls the piston/cylinder unit and the piston/cylinder unit.

2. The electrohydraulic brake system in accordance with claim 1, wherein the piston/cylinder unit, at least together with the valve assembly for switching over the brake system, the externally triggerable pressure generator unit, and the device for modulating the brake pressure, are disposed in a common hydraulic unit.

3. The electrohydraulic brake system in accordance with claim 2, wherein a piston of the piston/cylinder unit divides the cylindrical chamber into a primary side, subjected to pressure medium from the master cylinder, and a secondary side, which receives a restoring device for the piston, and wherein the secondary side is vented to the ambient atmosphere.

4. The electrohydraulic brake system in accordance with claim 2, a piston of the piston/cylinder unit divides the cylindrical chamber into a primary side, subjected to pressure medium from the master cylinder, and a secondary side, which receives a restoring device for the piston, and wherein the secondary side communicates with a return conduit leading away from the wheel brake.

5. The electrohydraulic brake system in accordance with claim 4, wherein the valve assembly for switching over the brake system comprises a number of operating mode switchover valves, corresponding to the number of existing brake circuits and wherein at least the operating mode switchover valve that controls the piston/cylinder unit is embodied as a 3/2-way valve.

6. The electrohydraulic brake system in accordance with claim 2, wherein the valve assembly for switching over the brake system comprises a number of operating mode switchover valves, corresponding to the number of existing brake circuits and wherein at least the operating mode switchover valve that controls the piston/cylinder unit is embodied as a 3/2-way valve.

7. The electrohydraulic brake system in accordance with claim 1, wherein a piston of the piston/cylinder unit divides the cylindrical chamber into a primary side, subjected to pressure medium from the master cylinder, and a secondary side, which receives a restoring device for the piston, and wherein the secondary side is vented to the ambient atmosphere.

8. The electrohydraulic brake system in accordance with claim 7, wherein the valve assembly for switching over the brake system comprises a number of operating mode switchover valves, corresponding to the number of existing brake circuits and wherein at least the operating mode switchover valve that controls the piston/cylinder unit is embodied as a 3/2-way valve.

9. The electrohydraulic brake system in accordance with claim 1, a piston of the piston/cylinder unit divides the cylindrical chamber into a primary side, subjected to pressure medium from the master cylinder, and a secondary side, which receives a restoring device for the piston, and wherein the secondary side communicates with a return conduit leading away from the wheel brake.

10. The electrohydraulic brake system in accordance with claim 9, wherein the valve assembly for switching over the brake system comprises a number of operating mode switchover valves, corresponding to the number of existing brake circuits and wherein at least the operating mode switchover valve that controls the piston/cylinder unit is embodied as a 3/2-way valve.

11. The electrohydraulic brake system in accordance with claim 1, wherein the valve assembly for switching over the brake system comprises a number of operating mode switchover valves, corresponding to the number of existing brake circuits, and wherein at least the operating mode switchover valve that controls the piston/cylinder unit is embodied as a 3/2-way valve.

* * * * *